(12) United States Patent
Yoshikawa et al.

(10) Patent No.: US 6,347,994 B1
(45) Date of Patent: Feb. 19, 2002

(54) GAME SYSTEM AND COMPUTER-READABLE RECORDING MEDIUM USED IN THE SAME

(75) Inventors: Yuji Yoshikawa, Tokyo; Nobuhiro Yamada, Hannou, both of (JP)

(73) Assignee: Konami Co., Ltd., Kobe (JP)

( * ) Notice: Subject to any disclaimer, the term of this patent is extended or adjusted under 35 U.S.C. 154(b) by 0 days.

(21) Appl. No.: 09/268,778

(22) Filed: Mar. 16, 1999

(30) Foreign Application Priority Data

Mar. 19, 1998 (JP) .......................................... 10-070943

(51) Int. Cl.$^7$ ................................................. A63F 9/24
(52) U.S. Cl. .............................. 463/7; 463/31; 345/473
(58) Field of Search .................................. 345/419, 426, 345/473; 463/7, 1, 30, 31, 37

(56) References Cited

U.S. PATENT DOCUMENTS

| | | | | |
|---|---|---|---|---|
| 5,662,332 A | * | 9/1997 | Garfield | 273/308 |
| 6,267,678 B1 | * | 7/2001 | Kubo et al. | 463/44 |
| 6,290,604 B2 | * | 9/2001 | Miyamoto et al. | 463/30 |

FOREIGN PATENT DOCUMENTS

JP          55-55112        12/1980

* cited by examiner

Primary Examiner—Mark Zimmerman
Assistant Examiner—Mackly Monestime
(74) Attorney, Agent, or Firm—Jordan and Hamburg LLP

(57) ABSTRACT

A game system comprises a first storing device storing data for identifying strength and weakness of characters belonging to a player and an opponent; a first display control device for displaying a first game picture which expresses a state of a competitive game in which the player and the opponent compete by using the characters; an outcome determining device for determining an outcome of the competitive game based on the data stored in the first storing device; a second storing device storing data for identifying, with respect to a plurality of areas defined by dividing a predetermined field into a matrix, that each of the areas belongs to a territory of the player or the opponent; a second display control device for displaying a second game picture, on which the field is expressed in such a manner that the territory belonging to the player can be differentiated from the territory belonging to the opponent, based on the data stored in the second storing device; and a data updating device for changing the data in the second storing device so that, when the player won the competitive game, there is a first change relating to the win, in that the territory belonging to the player increases, and in addition, there is a second change relating to the increase of the territory, in that at least one of the areas which is in a predetermined positional relationship with an increased part of the territory by the first change and an acquired part of the territory already belonging to the player is switched to the territory belonging to the player. Therefore, the game system prevents difficulty in determining the outcome of the game, while eliminating monotony thereof.

18 Claims, 15 Drawing Sheets

| | 1/ 2 |
|---|---|
| ⌑ ASTER | HP1007 |
| ○ SCALES | HP1008 |
| ▶◇ LIGHT CIRCLE | HP1009 |
| ⊙ SOUTH-SOUTHWEST | HP1009 |
| ⌐ RAIN SHELTER | HP1010 |

302 — points to ▶◇

301 — 
SEE IN DETAIL   SET FREE
CHANGE ORDER

PRESS START TO
    BEGIN BATTLE!

FIG. 8A

|    | 00 | 01 | 02 | 03 | 04 | 05 | 06 | 07 | 08 | 09 |
|----|----|----|----|----|----|----|----|----|----|----|
| 0  | 01 |    |    |    |    |    |    |    |    | 13 |
| 1  |    |    | 05 |    |    |    |    | 09 |    |    |
| 2  |    | 03 |    |    |    |    |    | 11 |    |    |
| 3  |    |    |    |    |    |    |    |    |    |    |
| 4  |    |    |    | 06 |    |    | 07 |    |    |    |
| 5  |    |    |    |    |    |    |    |    |    |    |
| 6  |    | 02 |    |    |    |    |    | 10 |    |    |
| 7  |    |    | 04 |    |    |    | 08 |    |    |    |
| 8  | 00 |    |    |    |    |    |    |    |    | 12 |

FIG. 8B

| POSITION NO. | POSITION WHICH CAN BE MOVED TO NEXT | |
|---|---|---|
| 00 | 02 | 04 |
| 01 | 06 | 04 |
| 02 | 04 | 03 |
| 03 | 01 | 05 |
| 04 | 05 | 02 |
| 05 | 03 | 05 |
| 06 | 07 | 08 |
| 07 | 08 | 10 |
| 08 | 09 | 10 |
| 09 | 11 | 10 |
| 10 | 12 | 08 |
| 11 | 10 | 08 |
| 12 | 13 | 11 |
| 13 | 00 | 01 |

FIG.9A

| MONSTER NO. | NAME | ATTRIBUTE | HP | COMMENTS |
|---|---|---|---|---|
| 000 | SHOWER | LIGHT | 1030 | |
| 001 | LIGHT CIRCLE | LIGHT | 1009 | |
| 002 | HEAVEN-EARTH | LIGHT | 1026 | |

FIG.9B

| MONSTER NO. | NAME | ATTRIBUTE | HP | COMMENTS | NUMBER AFTER CHANGE |
|---|---|---|---|---|---|
| 035 | LIGHTENING MARY | THUNDER | 975 | | 001 |
| 036 | POWER FAILURE | THUNDER | 993 | | 002 |
| 037 | SHOCKER | THUNDER | 977 | | 003 |

FIG.9C

| DATA NO. | NAME | EFFECT | SPECIAL EFFECT CONDITION | SPECIAL EFFECT | COMMENT |
|---|---|---|---|---|---|
| 000 | LIGHTENING DATA | +1 | LIGHT | +2 | |
| 001 | WIND DATA | +1 | BREEZE | +2 | |
| 002 | RAIN DATA | +2 | BENEVOLENT RAIN | +3 | |
| 020 | LIGHT ARMOR | +2 | LIGHT | +2 | |

FIG.9D

| ORDER | MONSTER NO. | ARMOR NO. |
|---|---|---|
| 1 | 009 | |
| 2 | 015 | 20 |
| 3 | 008 | |
| 4 | 001 | 22 |
| 5 | 004 | 25 |
| | 002 | |
| | 011 | |
| | 030 | |

GAME SYSTEM AND COMPUTER-READABLE RECORDING MEDIUM USED IN THE SAME

BACKGROUND OF THE INVENTION

1. Field of the Invention

The present invention relates to a game system capable of performing a game in which a player and his or her opponent use characters such as cards, and the outcome of the game is decided based on the strength of the characters.

2. Description of the Related Art

As one type of game executed in a video game system, there is widely known a card game in which a predetermined number of cards, such as trumps, having strength determined beforehand are dealt out to each of a player and his or her opponent (for instance, a computer), the player and the opponent then show their arbitrary cards, and the outcome is decided based on the strength and weakness of the cards.

The rules of the above game are simple, so that many players can become used to the game easily and play casually. However, this simplicity leads to the game being monotonous and becoming quickly tiresome. There are card games in which the outcome is determined according to complex rules in order to eliminate monotony, but this complexity makes the game difficult for an inexperienced player to follow, with the result that the game appeals only to a certain type of player.

SUMMARY OF THE INVENTION

It therefore is an object of the present invention to provide a game system which eliminates game monotony while preventing the outcome of the game from being difficult to determine, and a computer-readable recording medium used in the game system.

A first aspect of the present invention provides solution to the problems mentioned above by providing a game system comprising a first storing device storing data for identifying strength and weakness of characters belonging to a player and an opponent; a first display control device for displaying a first game picture which expresses a state of a competitive game in which the player and the opponent compete by using the characters; an outcome determining device for determining an outcome of the competitive game based on the data stored in the first storing device; a second storing device storing data for identifying, with respect to a plurality of areas defined by dividing a predetermined field into a matrix, that each of the areas belongs to a territory of the player or the opponent; a second display control device for displaying a second game picture, on which the field is expressed in such a manner that the territory belonging to the player can be differentiated from the territory belonging to the opponent, based on the data stored in the second storing device; and a data updating device for changing the data in the second storing device so that, when the player won the competitive game, there is a first change relating to the win, in that the territory belonging to the player increases, and in addition, there is a second change relating to the increase of the territory, in that at least one of the areas which is in a predetermined positional relationship with an increased part of the territory by the first change and an acquired part of the territory already belonging to the player is switched to the territory belonging to the player.

In this game system, the outcome of the competitive game executed on the first picture can be determined easily by reading out preset strengths of the characters from the data in the first storing device and comparing them, the winner being the stronger one. In the competitive game, when the player wins, the player's territory within the second picture is enlarged in correspondence with his win. Moreover, since the enlargement of the territory is carried out by two types of changes, comprising the first change relating to the win of the competitive game and the second change accompanying the first change, the enlargement can be varied in many ways, eliminating monotony of the game.

The above game system may further comprise an auxiliary character allocating device for allocating at least one auxiliary character to at least one of the player and the opponent when the competitive game is played, said auxiliary character being able to be used in combination with at least one of the characters; and a third storing device storing data for identifying effects of the auxiliary character on the competitive game, and the outcome determining device may determine the outcome of the competitive game by considering the data stored in the third storing device.

According to this embodiment, in addition to the strength of the player's characters and his or her opponent's characters, the influence of the auxiliary characters can be incorporated as a third element effecting the outcome of the competitive game. Therefore, the competitive game can be further varied.

The auxiliary character allocating device may allocate a plurality of auxiliary characters as said at least one auxiliary character to the player; and a combination selecting device may select a combination of the characters and the auxiliary characters, based on an instruction from the player.

According to this embodiment, the player is able to choose which auxiliary character to combine with his or her characters, and by applying conditions, such as changing the effect of each auxiliary character in compliance with the combination, the strategic quality of the game can be improved.

The data updating device may extract said at least one of the areas which is enclosed within the field vertically, horizontally or diagonally by the increased part and the acquired part of the territory, and change the data in the second storing device so that said extracted at least one of the areas is switched to the territory belonging to the player.

According to this embodiment, when the player's territory increases as a result of winning the competitive game, the area which is enclosed between the increased part and the acquired part of the territory is switched so that it belongs to the player, enabling enlargement of the territory to proceeds immediately, further varying the progression of the game.

The game system may further comprise a next potential area selecting device for selecting one of the areas as a potential next area which can potentially be changed to the territory belonging to the player in compliance with an instruction of the player, in advance of an execution of the competitive game, and when the player has won the competitive game after the potential next area has been selected, in a first change relating to this win, the data updating device may change the data in the second storing device so that the potential next area selected by the next potential area selecting device becomes the territory belonging to the player.

According to this embodiment, when the player has on the game, he or she can select in advance the area which will be switched to the territory belonging to the player, thereby enabling the intentions of the player to be reflect in territory enlargement.

Selection of the next area by the next potential area selecting device and the competitive game may be repeated until all of the areas within the field are switched to the territory belonging to the player.

According to this embodiment, the game can be repeated until all the areas in the field belong to the player, lengthening the time over which the player's interest in the game is maintained.

The potential next area which can be selected by the next potential area selecting device in advance of one turn of the competitive game may be restricted to a part of the areas within the field.

According to this embodiment, a fixed restriction is applied to territory enlargement, giving the order of territory enlargement a strategic nature. Consequently, the progression of the game is more varied.

A second aspect of the present invention provides solution to the problems mentioned above by providing a game system comprising a first storing device storing data for identifying strength and weakness of a plurality of characters belonging to each of a player and an opponent; a first display control device for displaying a first game picture which expresses a state of a competitive game in which the player and the opponent compete by using the characters in a predetermined order; an order indicating device for indicating the order in which the player uses the characters in the competitive game; an outcome determining device for determining an outcome of the competitive game based on the data stored in the first storing device; a second storing device storing data for identifying, with respect to a plurality of areas defined by dividing a predetermined field into a matrix, that each of the areas belongs to a territory of the player or the opponent; a second display control device for displaying a second game picture, on which the field is expressed in such a manner that the territory belonging to the player can be differentiated from the territory belonging to the opponent, based on the data stored in the second storing device; and a data updating device for changing the data in the second storing device so that, when the player won the competitive game, there is a first change relating to the win, in that the territory belonging to the player increases, and in addition, there is a second change relating to the increase of the territory, in that at least one of the areas which is in a predetermined positional relationship with an increased part of the territory by the first change and an acquired part of the territory already belonging to the player is switched to the territory belonging to the player.

According to this game system, multiple characters belonging to the player are repeatedly used in an order indicated by the player, and the outcome of the competitive game is determined in accordance with the strength and weakness of these characters and characters repeatedly used by the opponent. The quality of the game can be further improved by incorporating the order in which characters are used as one element in determining the outcome of the game.

In the above game system, the outcome determining device may comprise an individual outcome determining device for determining an individual outcome of a match between the characters each time the player and the opponent use the characters in accordance with a predetermined order, based on the data stored in the first storing device; and a general outcome determining device for determining the outcome of the competitive game between the player and the opponent based on a result of a plurality of determinations of the individual performance determining device.

According to this embodiment, the outcomes of the match between the individual characters and the outcome of the game between the player and his or her opponent are separately determined, making it possible to show these outcomes to the player and enable him or her to understand how the game is progressing.

The game system may further comprise a use order changing device for changing use order of the characters of the player based on an instruction from the player.

According to this invention, it is possible to change the order in which the characters are used in accordance with the state of the game, thereby more greatly reflecting the player's intentions in the development of the game.

The game system may further comprise an auxiliary character allocating device for allocating at least one auxiliary character to at least one of the player and the opponent when the competitive game is played, said auxiliary character being able to be used in combination with at least one of the characters; and a third storing device storing data for identifying effects of the auxiliary character on the competitive game, and the outcome determining device may determine the outcome of the competitive game by considering the data stored in the third storing device.

According to this embodiment, in addition to the strength of the player's characters and his or her opponent's characters, the influence of the auxiliary characters can be incorporated as a third element effecting the outcome of the competitive game. Therefore, the competitive game can be further varied.

The auxiliary character allocating device may allocate a plurality of auxiliary characters as said at least one auxiliary character to the player; and a combination selecting device may select a combination of the characters and the auxiliary characters, based on an instruction from the player.

According to this embodiment, the player is able to choose which auxiliary character to combine with his or her characters, and by applying conditions, such as changing the effect of each auxiliary character in compliance with the combination, the strategic quality of the game can be improved.

The data updating device may extract said at least one of the areas which is enclosed within the field vertically, horizontally or diagonally by the increased part and the acquired part of the territory, and change the data in the second storing device so that said extracted at least one of the areas is switched to the territory belonging to the player.

According to this embodiment, when the player's territory increases as a result of winning the competitive game, the area which is enclosed between the increased part and the acquired part of the territory is switched so that it belongs to the player, enabling enlargement of the territory to proceeds immediately, further varying the progression of the game.

The game system may further comprise a next potential area selecting device for selecting one of the areas as a potential next area which can potentially be changed to the territory belonging to the player in compliance with an instruction of the player, in advance of an execution of the competitive game, and when the player has won the competitive game after the potential next area has been selected, in a first change relating to this win, the data updating device may change the data in the second storing device so that the potential next area selected by the next potential area selecting device becomes the territory belonging to the player.

According to this embodiment, when the player has on the game, he or she can select in advance the area which will be switched to the territory belonging to the player, thereby enabling the intentions of the player to be reflect in territory enlargement.

Selection of the next area by the next potential area selecting device and the competitive game may be repeated until all of the areas within the field are switched to the territory belonging to the player.

According to this embodiment, the game can be repeated until all the areas in the field belong to the player, lengthening the time over which the player's interest in the game is maintained.

The potential next area which can be selected by the next potential area selecting device in advance of one turn of the competitive game may be restricted to a part of the areas within the field.

According to this embodiment, a fixed restriction is applied to territory enlargement, giving the order of territory enlargement a strategic nature. Consequently, the progression of the game is more varied.

According to a third aspect of the present invention, there is provided a computer-readable recording medium, in which a program for executing a predetermined game with referring to first data and second date is recorded, said first date is prepared for identifying strength and weakness of characters belonging to a player and an opponent, said second data is prepared for identifying, with respect to a plurality of areas defined by dividing a predetermined field into a matrix, that each of the areas belongs to a territory of the player or the opponent, and said program is read out by a computer and causes the computer to execute the steps of: displaying a first game picture which expresses a state of a competitive game in which the player and the opponent compete by using the characters; determining an outcome of the competitive game based on the first data; displaying a second game picture, on which the field is expressed in such a manner that a territory belonging to the player can be differentiated from the territory belonging to the opponent, based on the second data; and changing the second data so that, when the player won the competitive game, there is a first change relating to the win, in that the territory belonging to the player increases, and in addition, there is a second change relating to the increase of the territory, in that at least one of the areas which is in a predetermined positional relationship with an increased part of the territory by the first change and an acquired part of the territory already belonging to the player is switched to the territory belonging to the player.

According to this invention, the game system of the first aspect can be realized by using a computer to read out and execute the program recorded in the recording medium.

According to a fourth aspect of the present invention, there is provided a computer-readable recording medium, in which a program for executing a predetermined game with referring to first data and second date is recorded, said first date is prepared for identifying strength and weakness of a plurality of characters belonging to each of a player and an opponent, said second data is prepared for identifying, with respect to a plurality of areas defined by dividing a predetermined field into a matrix, that each area belongs to the player or to the opponent, and said program is read out by a computer and causes the computer to execute the steps of; displaying a first game picture which expresses a state of a competitive game in which the player and the opponent compete by using the characters in a predetermined order; determining an outcome of the competitive game based on the first data; displaying a second game picture, on which the field is expressed in such a manner that the territory belonging to the player can be differentiated from the territory belonging to the opponent, based on the second data; and changing the second data so that, when the player won the competitive game, there is a first change relating to the win, in that the territory belonging to the player increases, and in addition, there is a second change relating to the increase of the territory, in that at least one of the areas which is in a predetermined positional relationship with an increased part of the territory by the first change and an acquired part of the territory already belonging to the player is switched to the territory belonging to the player.

According to this invention, the game system of the second aspect can be realized by using a computer to read out and execute a program recorded in the recording medium.

In the above invention, the characters can be created on the picture by forms such as cards, pieces and blocks. The recording medium comprises a CD-ROM, a RAM, a ROM, a hard disk, a floppy disk, optical magnetic disk or the like.

BRIEF DESCRIPTION OF THE DRAWINGS

FIG. 4 is a diagram showing a monster selection picture displayed in the game executed in the game system of FIG. 1;

FIGS. 8A and 8B are diagrams to explain the contents of data identifying positions on the map picture of FIG. 2, which the player can select and their order of selection;

FIGS. 9A to 9D are diagrams showing various kinds of data used in the game system of FIG. 1;

DESCRIPTION OF THE PREFERRED EMBODIMENTS

Figure 1:
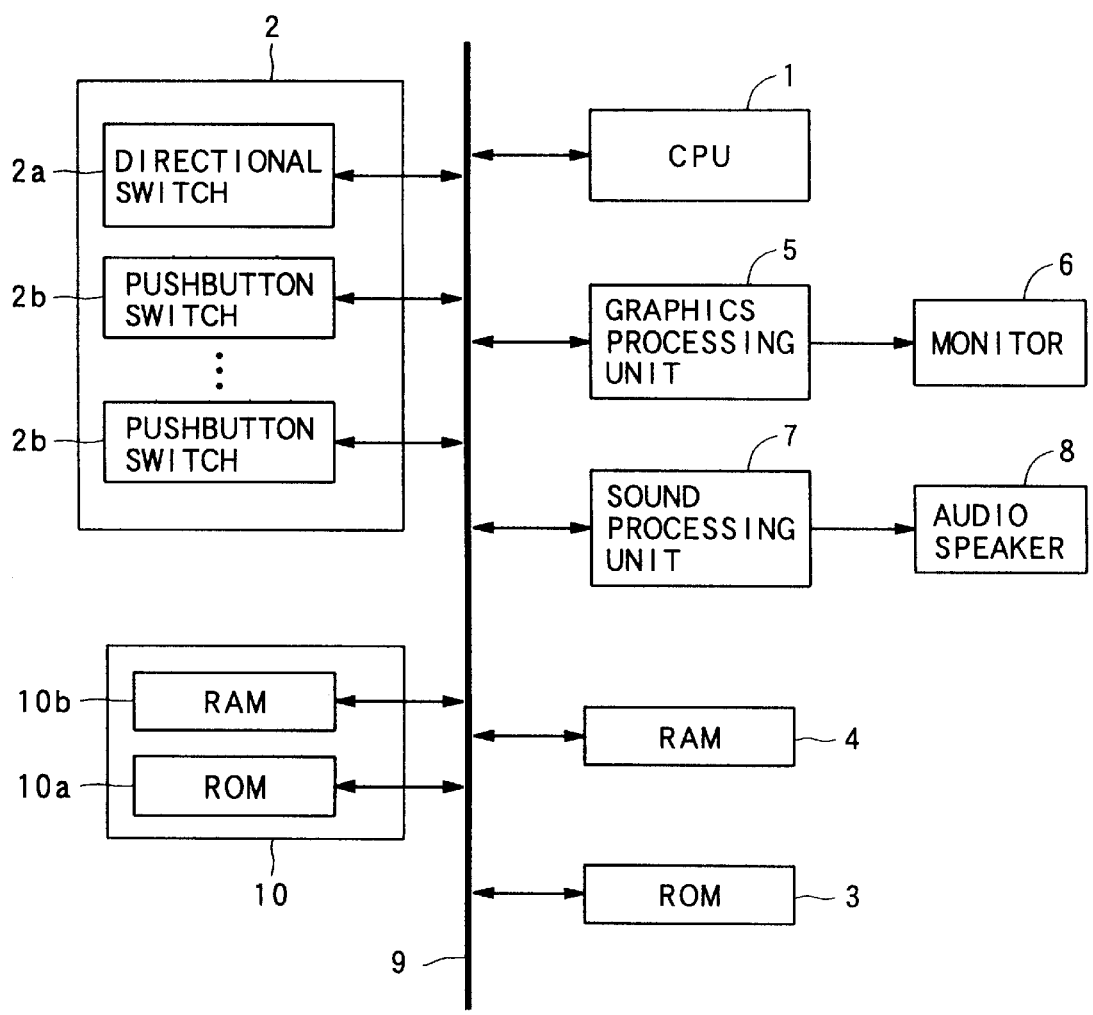
FIG. 1 is a block diagram showing a schematic configuration of a control system provided in the game system of the present invention.

FIG. 1 is a block diagram showing a schematic configuration of a control system provided in the game system to which the present invention is applied. This game system comprises a CPU 1, mainly comprising a microcomputer, for controlling operations and carrying out various calculations required during the game; an input device 2 for outputting signals in correspondence with an operation carried out by the player; a ROM 3 in which programs and data for controlling basic operations of the game system such as activation have been written; a RAM 4 in which programs and data required during the game are written whenever necessary; a graphics processing unit 5 for drawing a desired picture on a screen of a monitor 6 in compliance with a command from the CPU 1; and a sound processing unit 7 for outputting a desired sound from an audio speaker 8 in compliance with a command from the CPU 1. The CPU 1 is electrically connected, through a bus 9, to the input device 2, the ROM 3, the RAM 4, the graphics processing unit 5 and the sound processing unit 7.

A directional switch 2a, for instructing movements of a cursor and the like displayed on the screen of the monitor 6 in the vertical and horizontal directions thereof, and an appropriate number of pushbutton switches 2b . . . 2b are provided to the input device 2. An external storage medium 10 is electrically connected to the bus 9 so as to be freely detachable therefrom. The external storage medium 10 comprises a ROM 10a in which programs and data required for the game are stored, and a RAM 10b capable of storage-holding, in which mid-game data and the like are saved.

FIGS. 2 to 7 show examples of pictures displayed during a game executed in accordance with a game program stored in the ROM 10a. Below, a summary of the game will be explained with reference to these diagrams.

Figure 2:
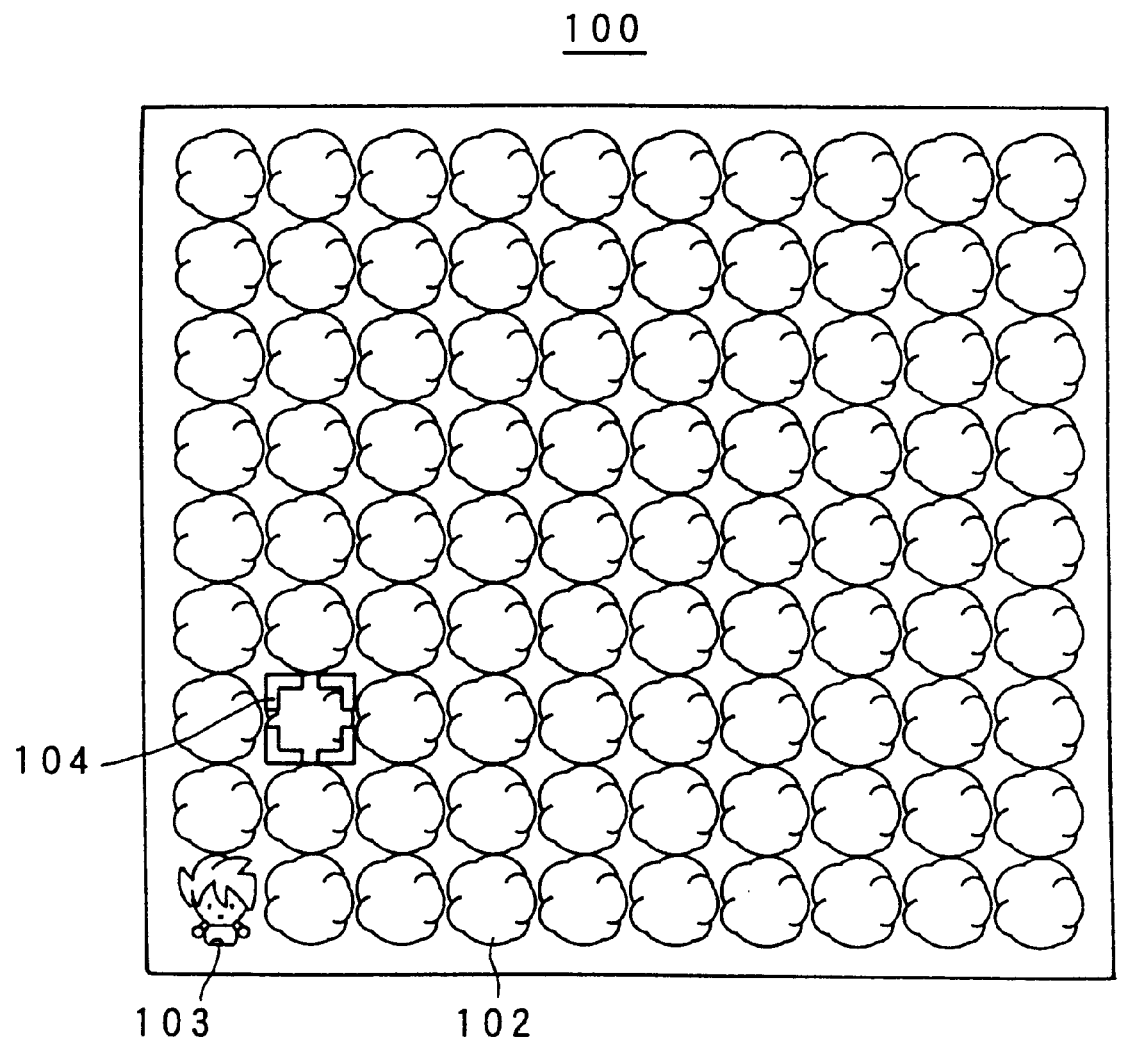
FIG. 2 is a diagram showing an initial state of a map picture displayed in a game executed in the game system of FIG. 1.
Figure 3:
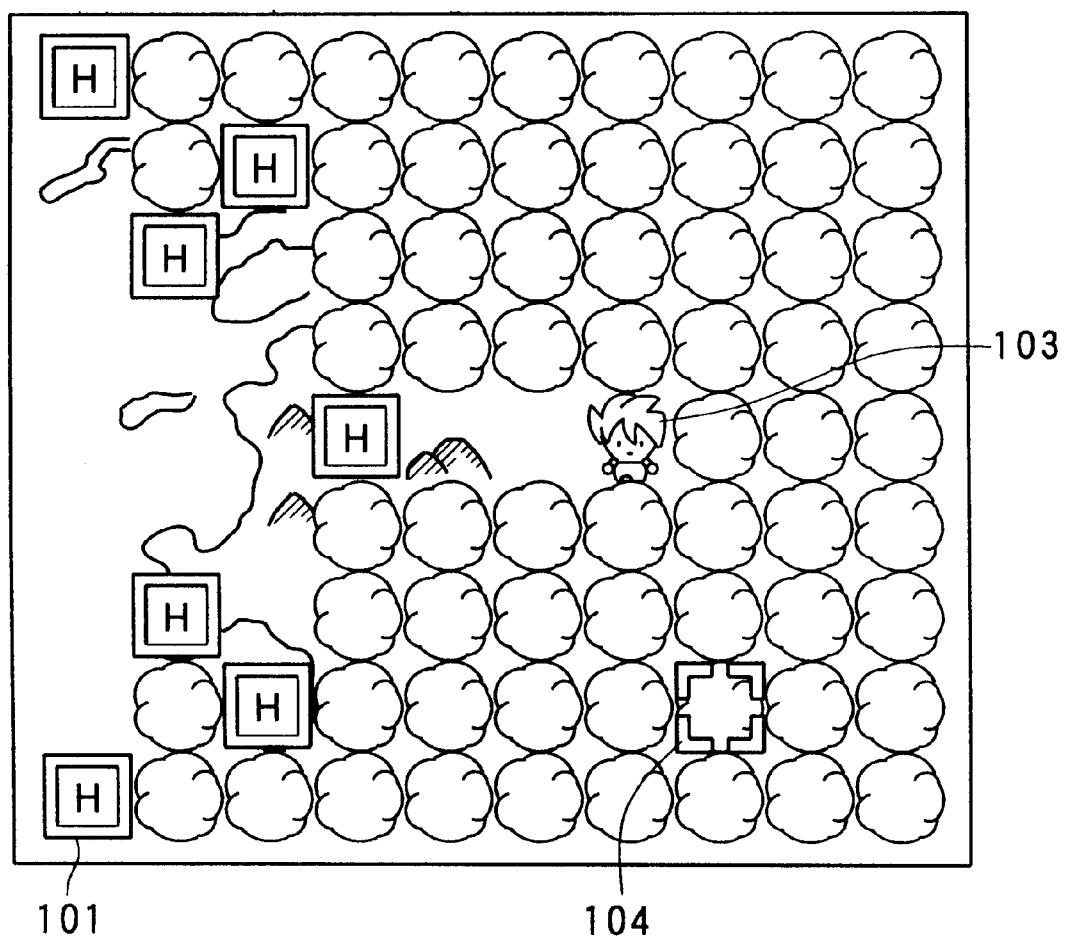
FIG. 3 is a diagram showing a state when the player's territory has been enlarged in comparison with the state of FIG. 2.
Figure 5:
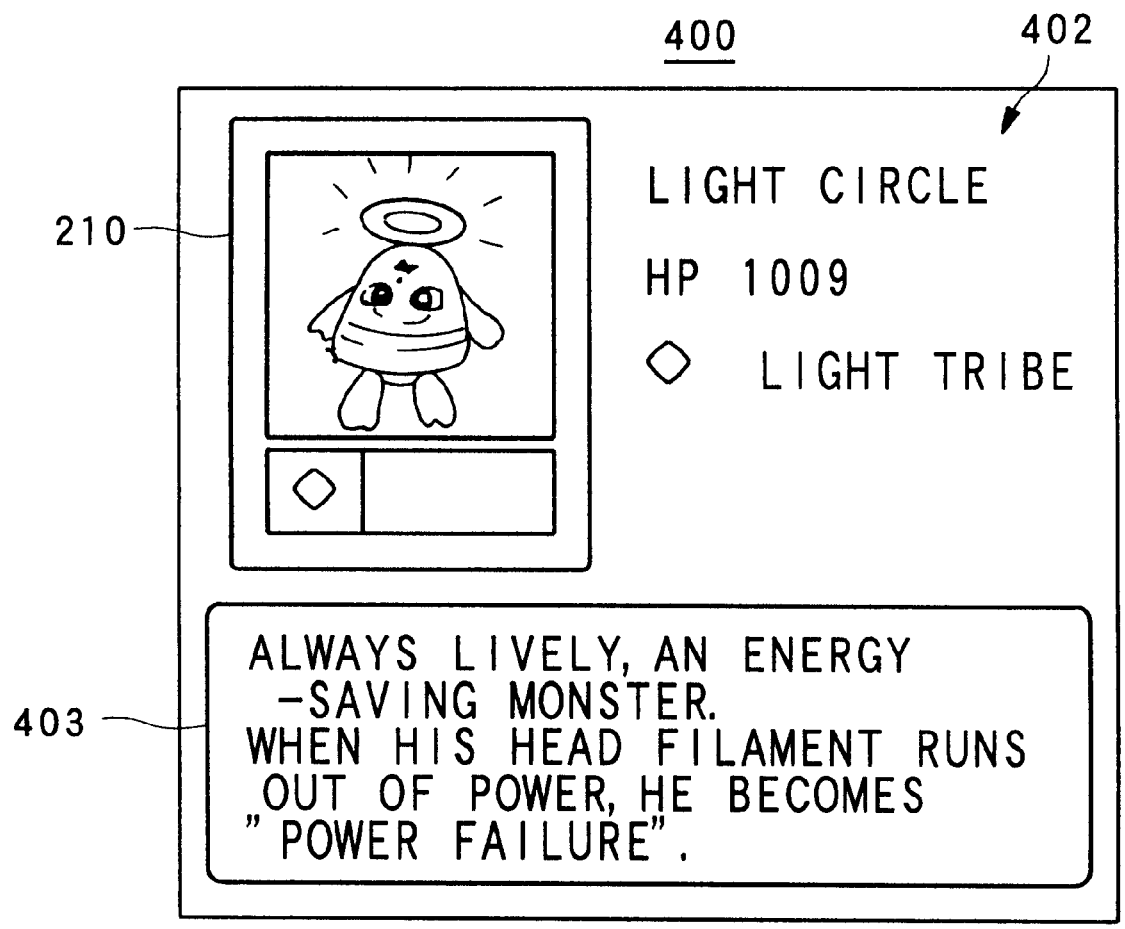
FIG. 5 is a diagram showing a monster detail picture displayed in the game executed in the game system of FIG. 1.

In the game executed by the game system of the present embodiment, a "high pressure army" is operated by the player using the input device 2, a "low pressure army" is operated by the CPU 1, and the two armies battle each other while changing their positions within a map picture 100 (FIG. 2), with the result that the high pressure army increases its camp 101 (FIG. 3).

As shown in FIGS. 2 and 3, the map picture 100 is divided into a total of 90 squares (areas), there being nine horizontal rows and ten vertical columns. At the start of the game, as shown in FIG. 2, clouds 102 are displayed in all the squares. This represents the fact that all the squares of the map picture 100 are ruled by the low pressure army, and as a consequence the entire earth surface is clouded over. Furthermore, a main character 103 is displayed on the map picture 100 for representing the present position at which the "high pressure army" is disposed. At the start of the game, the main character 103 is displayed at an initial position fixed at the bottom left corner of the map picture 100 (FIG. 2). Then, as the camps 101 increase, the main character 103 sequentially moves, gradually removing the clouds 102 and revealing the earth surface (FIG. 3).

Figure 6:
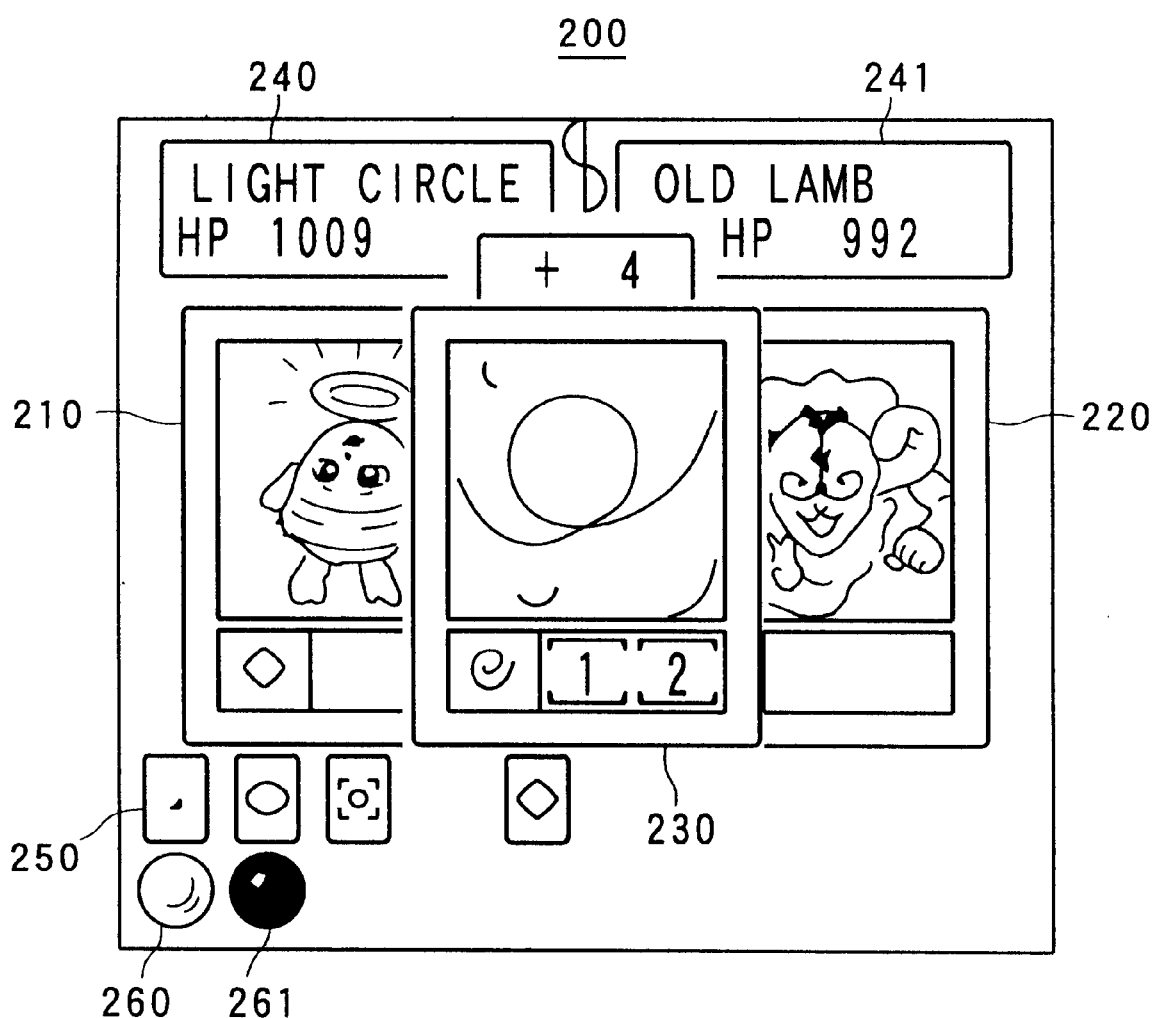
FIG. 6 is a diagram showing a battle picture displayed in the game executed in the game system of FIG. 1.
Figure 7:
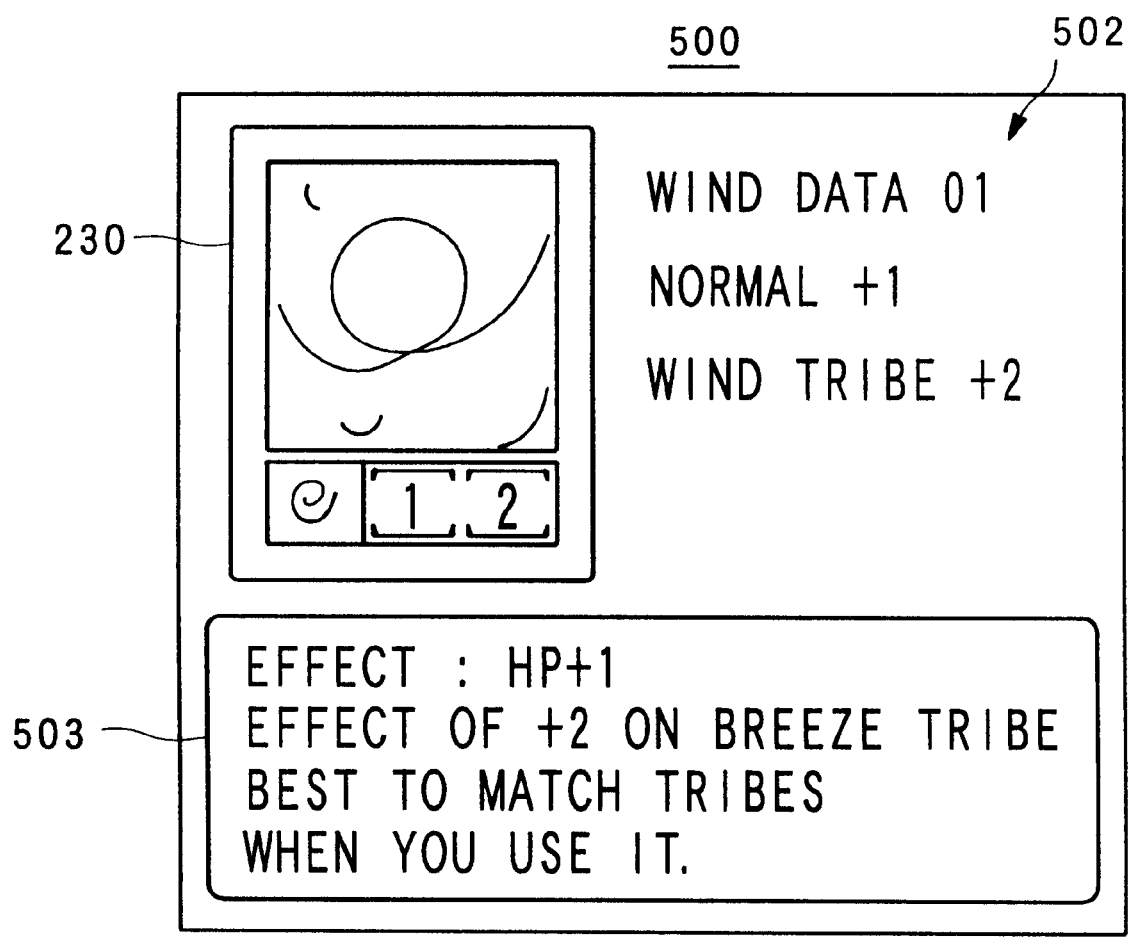
FIG. 7 is a diagram showing an atmospheric pressure card picture displayed in the game executed in the game system of FIG. 1.

A cursor 104 is displayed at a square to which the main character 103 may potentially move. When the player uses the input device 2 to select the next position to move to on the map picture 100, the battle picture 200 of FIG. 6 is displayed after a predetermined procedure. In the battle picture 200, there are displayed monster cards 210 and 220, which belong respectively to the high pressure army and the low pressure army, and an atmospheric pressure data card 230, which is used in combination with these monster cards 210 and 220. The atmospheric pressure data card 230 is displayed only when required.

During the battle stage, each army can have five monster cards 210 or 220, and five atmospheric pressure data cards 230 are dealt out to each army. In one battle, each army lays one monster card 210 and 220. Furthermore, the player and the CPU 1 each select one card from the five atmospheric pressure data cards 230 to be used in combination with the monster cards 210 and 220. Then, the outcome is decided based on the strength of the monster cards 210 and 220 and the effect of the atmospheric pressure data cards 230 combined with them. The strength of the monster cards 210 and 220 is expressed in hectopascals (hereinafter HP) which is the unit of atmospheric pressure. The strength of the monster card 210 of the high pressure army increases with increasing the value of the HP, while the strength of the monster card 220 of the low pressure army increases with decreasing the value of the HP.

The battle picture 200 includes data display sections 240 and 241 which show the names and strengths of the monster cards 210 and 220. Furthermore, card icons 250, corresponding to the five monster cards 210 . . . 210 belonging to the high pressure army, are displayed from left to right in order of battle sequence below the monster cards 210 of the high pressure army. In addition, icons 260 and 261, each showing battle result, are displayed below each of the card icons 250. The card icon 250 which corresponds to the winning card 210 is displayed with a white icon 260, and the card icon 250 which corresponds to the losing card 210 is displayed with a black icon 261. When the two armies draw, neither of the icons 260 and 261 is displayed. The monster cards 210 and 220 which are enlarged on the picture 200 are used in the present battle sequence, and the card icon 250 which corresponds to the enlarged monster card 210 temporarily disappears. In the picture shown in FIG. 6, the card icon 250 which is fourth from the left is disappeared. This indicates that the fourth monster card 210 is presently battling.

The battle is repeated at one battle position on the map picture 100 no further than the fifth monster card 210 and 220 (fifth battle sequence) held by each army. If the high pressure army is the first to win three, the high pressure army is the winner, and at this battle position becomes the camp 101 of the high pressure army. In the map picture 100, these camps 101 are shown by the symbol "H" (FIG. 3). When the cloud 102 is enclosed by a pair of high pressure army camps 101 and 101 in the vertical, horizontal or diagonal direction on the map picture 100, that cloud 102 disappears therefrom so that the territory belonging to the high pressure army is enlarged. When the cloud 102 disappears, the earth surface which was covered by it is displayed on the map picture 100. When all the clouds 102 have been removed, the map picture 100 is cleared and the battle proceeds to the next map picture 100. The game ends when a predetermined number of map pictures 100 . . . 100 prepared beforehand have all been cleared.

In the above game, a fixed limit is imposed beforehand on both the positions of squares to which the high pressure army can move in each map picture 100, and the order of its movements. An example of this limitation will be explained using FIGS. 8A and 8B.

As shown in FIG. 8A, in the present game, the squares of the map picture 100 are managed using numbers 0 to 9 of rows from top to bottom, and numbers 00 to 09 of columns from left to right. Then, position numbers 00 to 13 are assigned to positions which can be selected as battle positions within the ninety squares. The position number 00 represents the start position. Furthermore, as shown in FIG. 8B, each position number is associated with other two position numbers of the potential next positions which can be selected as the next battle position when the high pressure army has won (cleared) at each battle position. For instance, when the high pressure army has won at the position numbered 00, the high pressure army can only move to the square with the position numbered 02 or 04. As is clear from FIG. 8A, the position number 02 is the square with the row number 6 and the column number 01, and similarly, the row number and the column number of the corresponding square for the position number 04 can be identified by referring to the data shown in FIG. 8A. The data representing the relation between the position numbers and the row and the column numbers of the squares shown in FIG. 8A, and the data representing the relation between the position numbers and the potential next positions shown in FIG. 8B, are stored in the ROM 10a in correspondence with each map picture 100.

Furthermore, data relating to the monster cards 210 and 220 and the atmospheric pressure data cards 230 is prepared beforehand and stored in the ROM 10a. FIG. 9A shows an example of data relating to monster cards 210 of the high pressure army, FIG. 9B shows an example of data relating to monster cards 220 of the low pressure army, and FIG. 9C shows an example of data relating to the pressure data cards 230.

As clearly shown in FIGS. 9A and 9B, the data relating to the monster cards 210 and 220 includes a monster number, a name, an attribute and strength (HP) in association with each monster number, and comments and the like to be displayed in relation to that monster. In this game, when the high pressure army wins, the monster cards 220 of the defeated low pressure army are changed to the monster cards 210 of the high pressure army, and can be used in subsequent battles. Therefore, the data relating to the monster cards 220 of the low pressure army includes information identifying which of the high pressure army monster cards 210 the monster cards 220 should be changed to. For instance, in FIG. 9B, the monster card number 035 is registered with a post-change monster number of 001, signifying that the monster card 220 of the number 035 changes to the monster card 210 of the number 001 of the high pressure army.

As clearly shown in FIG. 9C, the data relating to the atmospheric pressure data cards 230 comprises a data number, a name, an effect, a special effect condition and a special effect in association with the data number, and comments and the like to be displayed in relation to that monster. For instance, the atmospheric pressure data card 230 of the number 000 has a name "light data 01", and its effect is to raise the strength of a monster card 210 by 1HP. Furthermore, the condition of its special effect is that it must be combined with a monster card 210 having the attribute of "Light", and its special effect is to raise the strength of the monster card 210 by 2 HP.

As is clear from FIG. 9C, the atmospheric pressure data cards 230 include an "armor card" (for instance, the data number 020). Like other atmospheric pressure data cards 230, the armor card increases the HP of the monster cards 210 and 220 by a predetermined value, but whereas other pressure data cards can only be used in one battle, the armor card can be repeatedly used in subsequent battles as long as it is not substituted by the other armor card. Furthermore, there is a special type of the armor card called an "armor improving card" whose effect will be explained later. Moreover, image data (not shown in the figures), for displaying images of the monster cards 210 and 220 and the atmospheric pressure data cards 230, is stored in the ROM 10a in association with the monster numbers and data numbers.

FIGS. 10 to 15 show control procedures of the game executed by the CPU 1. When a power switch (not shown in the figures) is operated to supply electrical power into the game system, the CPU 1 starts the procedure shown in FIG. 10. In this procedure, firstly, predetermined start-up processing is carried out in compliance with a program and data in the ROM 3 (Step S1); next, an opening picture (or a animation), predetermined in compliance with a program and data stored in the external storage medium 10, is displayed (Step S2). At the end of this opening picture, the player is asked to choose whether to start a new game, or to restart a game midway based on data saved in the RAM 10b.

After the opening picture has been displayed, the CPU 1 determines whether a predetermined selection operation has been performed by the player using the input device 2 (Step S3), and if such an operation has been performed, the CPU 1 determines whether or not the player has selected to start a new game (Step S4), and if the player has selected a new game, the CPU 1 reads out predetermined initial data from the ROM 10a and stores it in the RAM 4 (Step S5). On the other hand, when the CPU 1 has determined that a new game has not been selected in Step S4, the CPU 1 checks data saved in the RAM 10b (Step S6); then, it determines whether or not data for restarting a game midway has been saved (Step S7). If such data exists, the CPU 1 reads the saved data and stores it in the RAM 4 (Step S8), and if there is no saved data, the CPU 1 advances the procedure to Step S5 and loads the initial data.

When executing Step S5 and Step S8, data for determining the present position of the high pressure army (the display position of the main character 103) on the map picture 100, whether or not each of the battle positions on the map picture 100 (the positions numbered 00 to 13 in FIG. 8A) is a camp 101 of the high pressure army, and whether or not each square on the map picture 100 is covered by a cloud 102, are stored in the RAM 4. Furthermore, data showing the organization of the high pressure army is stored in the RAM 4. As for instance shown in FIG. 9D, this organization data is for specifying the monster numbers of the monster cards 210 which can presently be selected by the high pressure army from among the great number of the monster cards 210 stored in the ROM 10a, and the numbers of the armor data attached to these selectable monster cards 210. Where no armor number is associated with the monster number, this signifies that no armor is attached to the monster. The player is able to select five numbers from the monster numbers registered in this high pressure army organization data, and can use these for battling. Orders 1 to 5 are registered for the five selected monster numbers in compliance with their battle sequence. The initial organization data stored in the ROM 10a is loaded to the RAM 4 when Step S5 of FIG. 1 has been carried out.

When the data has been loaded to the RAM 4, the CPU 1 displays on the monitor 6 a predetermined game picture for the game about to start (Step S9), and then shifts to the game procedure (Step S10). When the game has been processed, the CPU 1 returns the procedure to Step S2.

Figure 11:
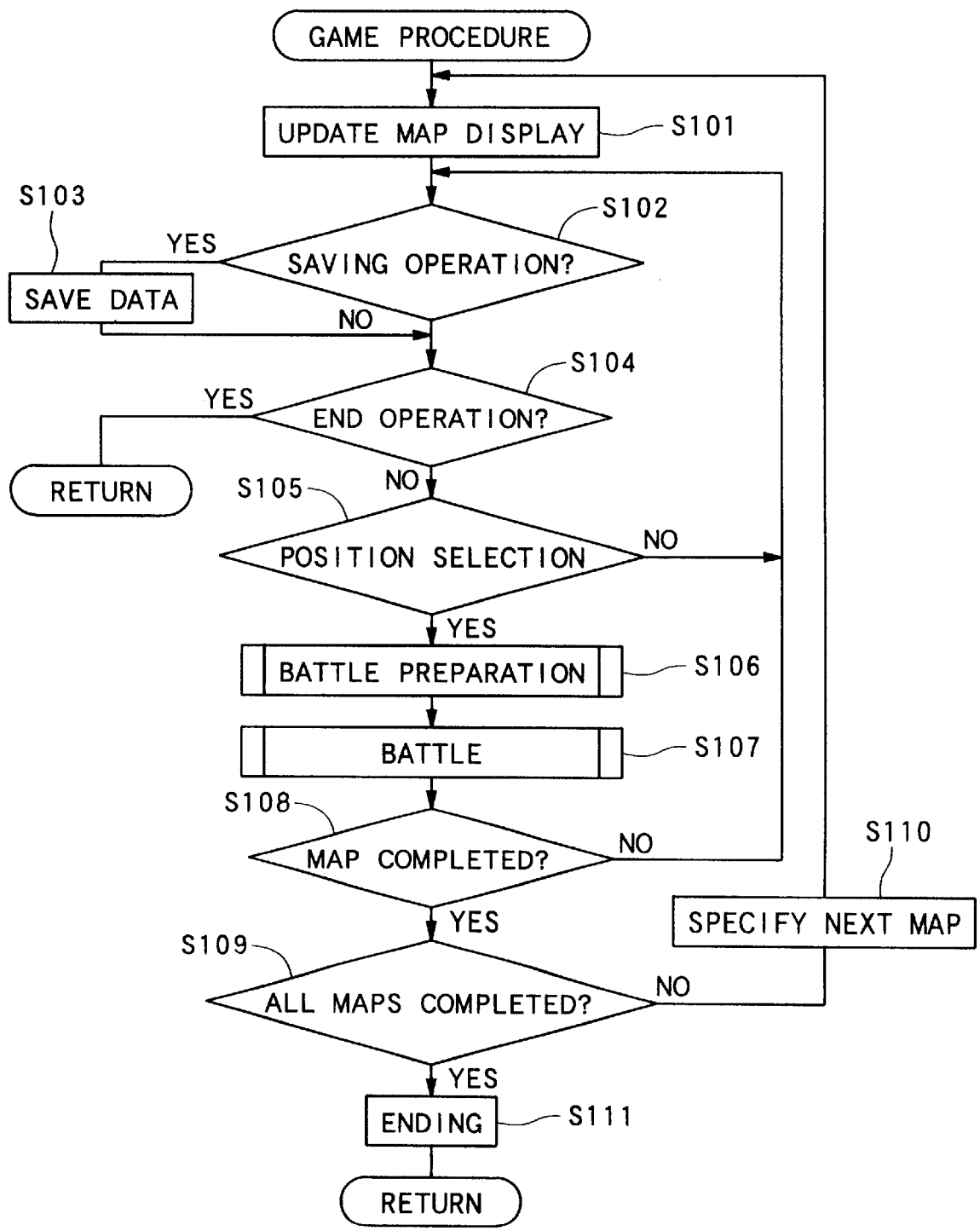
FIG. 11 is a flowchart showing a game procedure performed by the CPU as a subroutine of the procedure of FIG. 10.

FIG. 11 shows the game procedure. In this game procedure, firstly, the display of the map picture 100 is updated based on the distribution of the camps 101 and the clouds 102, and the present position of the high pressure army on the map picture 100 stored in the RAM 4 (Step S101). The map picture 100 appears on the screen of the monitor 6 when this processing is first performed after starting a new game or restarting the game.

After the display has been updated, the CPU 1 determines whether or not the player has performed a predetermined save operation using the input device 2 (Step S102), and if so, data required in order to restore the data stored in the RAM 4 is saved in the RAM 10b at that point (Step S103), and thereafter, the CPU1 advances the procedure to Step S104. If no save operation has been carried out, the CPU 1 skips Step S103 and advances the procedure to Step S104. In Step S104, the CPU 1 determines whether or not the player has performed a predetermined end operation using the input device 2, and if so, the game ends and the procedure returns to the procedure of FIG. 10. If there is no end operation, the procedure advances to Step S105.

In Step S105, it is determined whether the player has used the input device 2 to select a position to which he or she next wants to forward on the map picture 100, and when no selection operation has been made, the procedure returns to Step S102. If a position has been selected in Step S105, the position is stored in the RAM 4 as the next battle position, and thereafter a battle preparation procedure and a battle procedure are sequentially carried out (Step S106 and Step S107). When the battle procedure is completed, it is determined whether the map picture 100 displayed on the monitor 6 has been completed, that is, whether all the clouds 102 have been removed on the basis of the data for specifying the distribution of the clouds 102 stored in the RAM 4 (Step S108), and if it has not been completed, the procedure returns to Step S102. When it has been determined that one map picture 100 has been completed, the procedure advances to Step S109 where it is determined whether or not all the map pictures 100 stored in the ROM 10a have been completed. If they have not been completed, the next map picture 100 is specified as a battle region in compliance with a predetermined sequence (Step S110), and thereafter, the procedure returns to Step S101. When all the map pictures 100 have been completed, the procedure advances to Step S111 where a predetermined ending picture is displayed on the monitor 6. Consequently, the game procedure is completed and the CPU 1 returns the processing to the procedure of FIG. 10.

Figure 12:
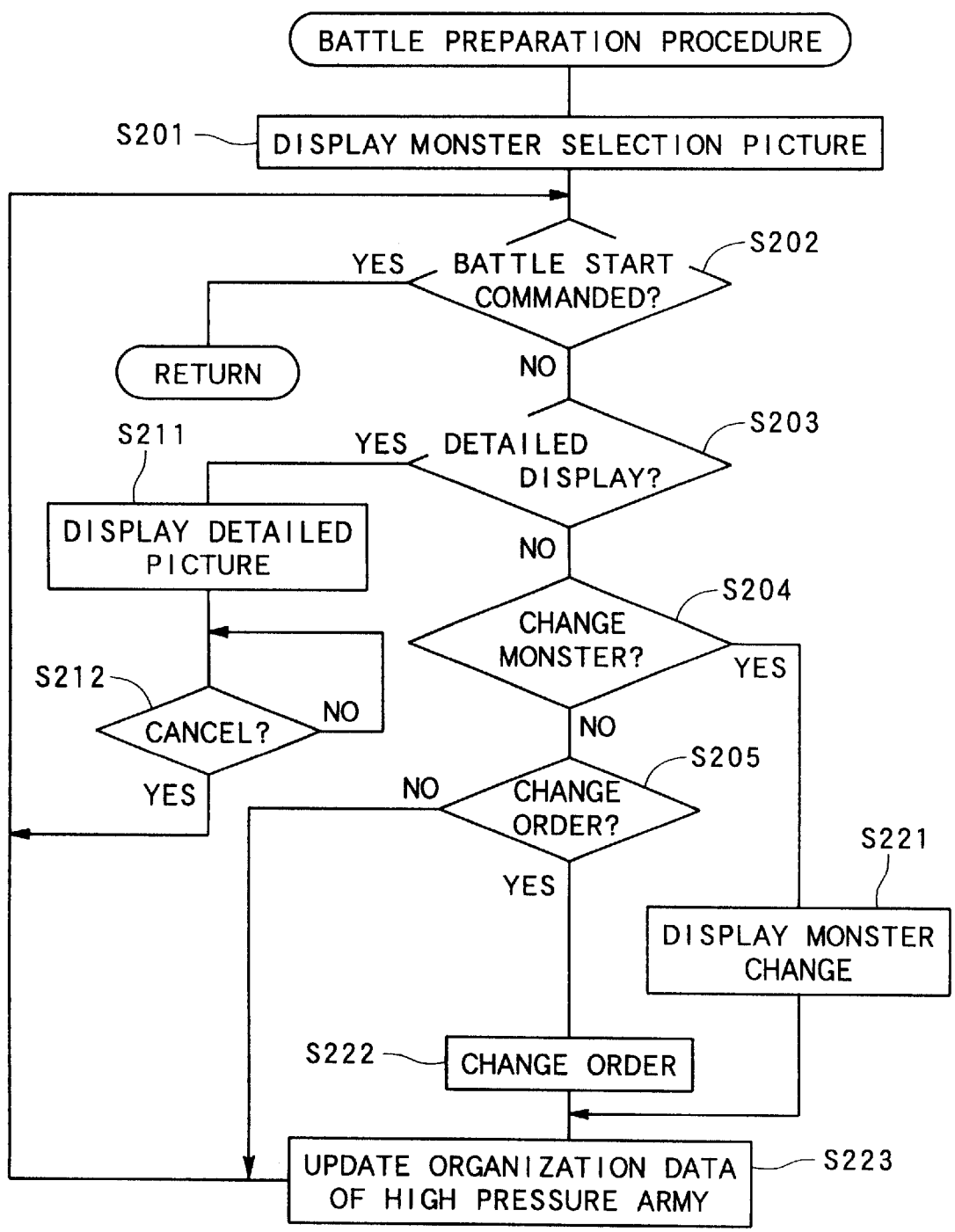
FIG. 12 is a flowchart showing a battle preparation procedure performed by the CPU as a subroutine of the procedure of FIG. 11.

FIG. 12 shows in detail the battle preparation procedure of FIG. 11 (Step S106). In this battle preparation procedure, firstly, the monster selection picture 300 of FIG. 4 is displayed on the monitor 6 (Step S201). This selection picture 300 displays the names and the strength of the five monsters, which are associated with the battle orders 1 to 5 in the organization data of the high pressure army stored in the RAM 4, so as to be arranged from top to bottom in the picture according to their battle order. Furthermore, a command display portion 301 is provided at the bottom of the selection picture 300 to display commands which can be selected during the battle preparation procedure.

After the selection picture 300 has been displayed, it is determined whether the player has operated the input device 2 to request a battle start (Step S202 in FIG. 12). When the battle start is not requested, it is determined whether the player has requested through the input device 2 to show monster details, to change monster, or to change order (Steps S203, S204 and S205). When all these are found to be negative, the procedure returns directly to Step S202.

When it is determined as affirmative at Step S203, a monster detail picture 400 (FIG. 5), showing contents of the monster card 210, is displayed on the monitor 6 (Step S211). This picture 400 displays the monster card 210 indicated at the cursor 302 of the selection picture 300 (see FIG. 4), a data section 402 in which the name and the strength of that monster card 210 are shown, and a comment section 403 about the monster card 210. The image of the card 210 and the contents of the sections 402 and 403 are decided based on data stored in the ROM 10a (see FIGS. 9A to 9D). After the monster detail picture 400 has been displayed, it is determined whether the player has requested cancellation of the display through the input device 2 (Step S212 of FIG. 12), and when cancel is requested, the procedure returns to Step S202.

When Step S204 of the procedure in FIG. 12 is affirmed, the CPU changes the monster indicated by the cursor 302 among the monsters displayed on the selection picture 300 to another monster. The new monster is selected from among the monsters which are not associated with the orders in the high pressure army organization data stored in the RAM 4 (see FIG. 9D).

Furthermore, when it is determined as affirmative at Step S205, the CPU 1 changes the order of the monsters displayed on the monster selection picture 300 in correspondence with an operation of the input device 2 (Step S222). Then, after the processing of Steps S221 and S222, the high pressure army organization data in the RAM 4 is updated to reflect these changes (Step S223), and thereafter the CPU 1 returns the procedure to Step S202. Then, in Step S202, when it is determined that the player has requested the battle start by operating the input device 2, the battle preparation procedure ends and the CPU 1 advances the procedure to Step S107.

Figure 10:
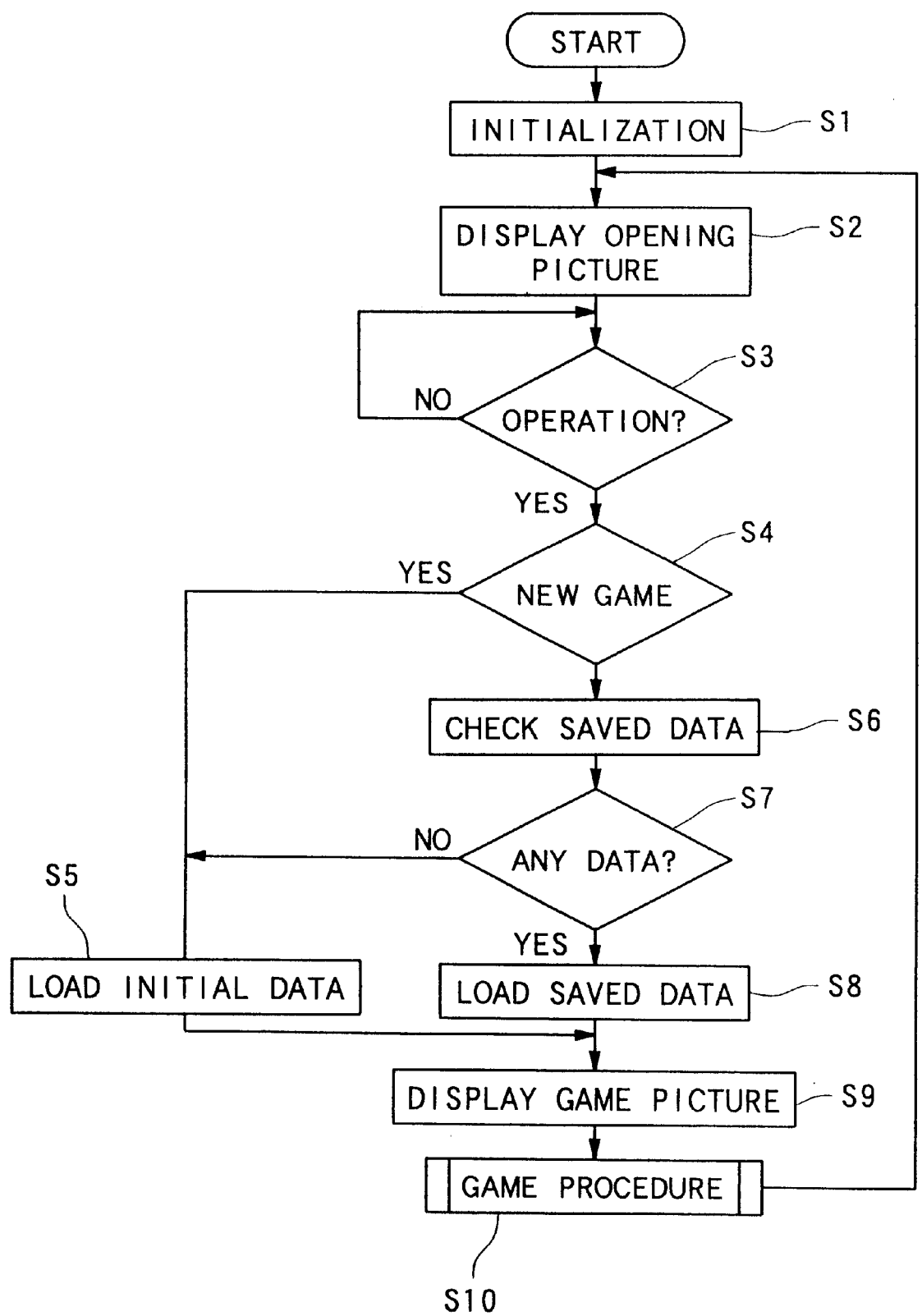
FIG. 10 is a flowchart showing a procedure of a main routine performed by a CPU in the game system of FIG. 1.
Figure 13:
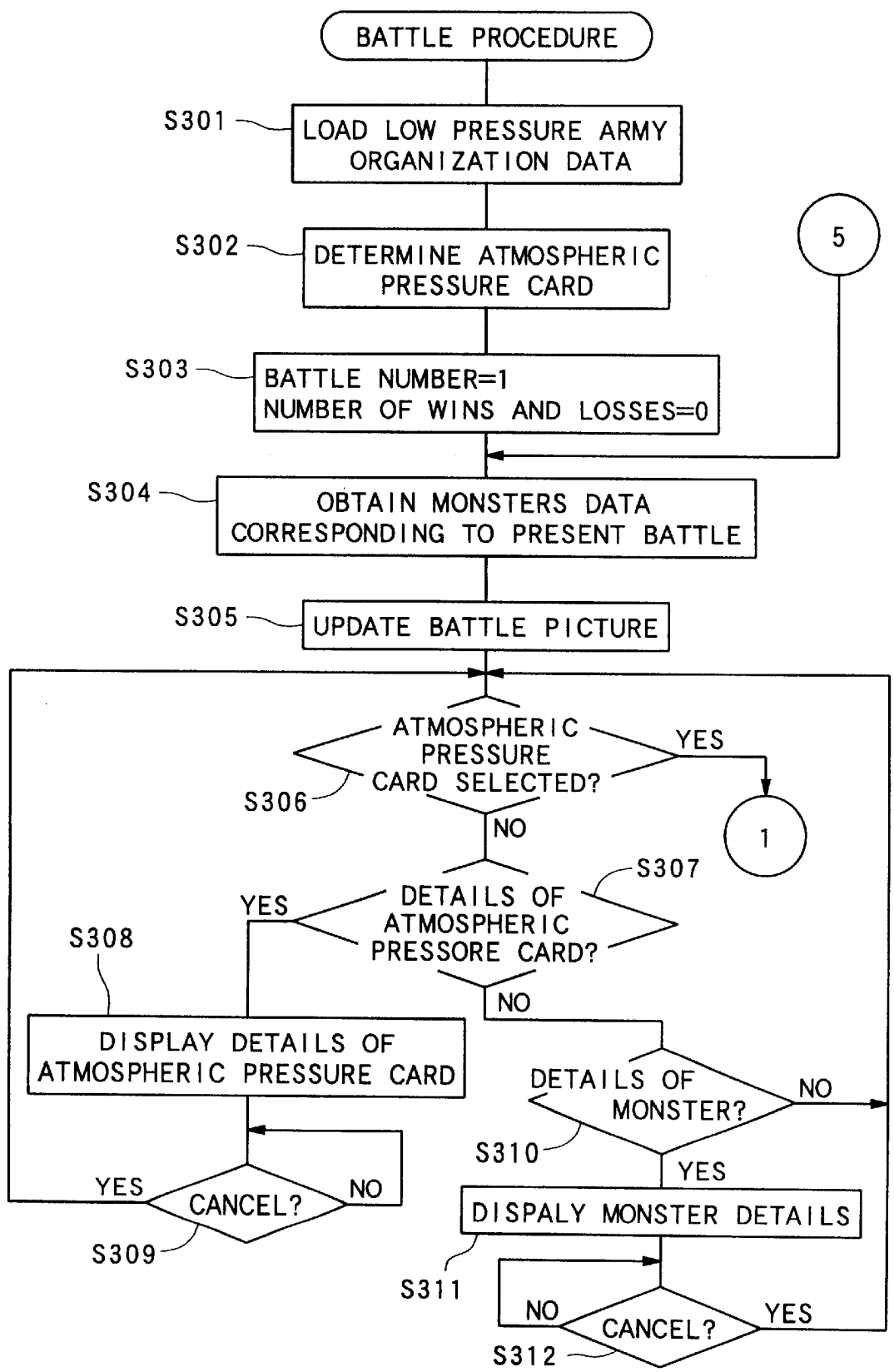
FIG. 13 is a flowchart showing a battle procedure performed by the CPU as a subroutine of the procedure of FIG. 11.
Figure 14:
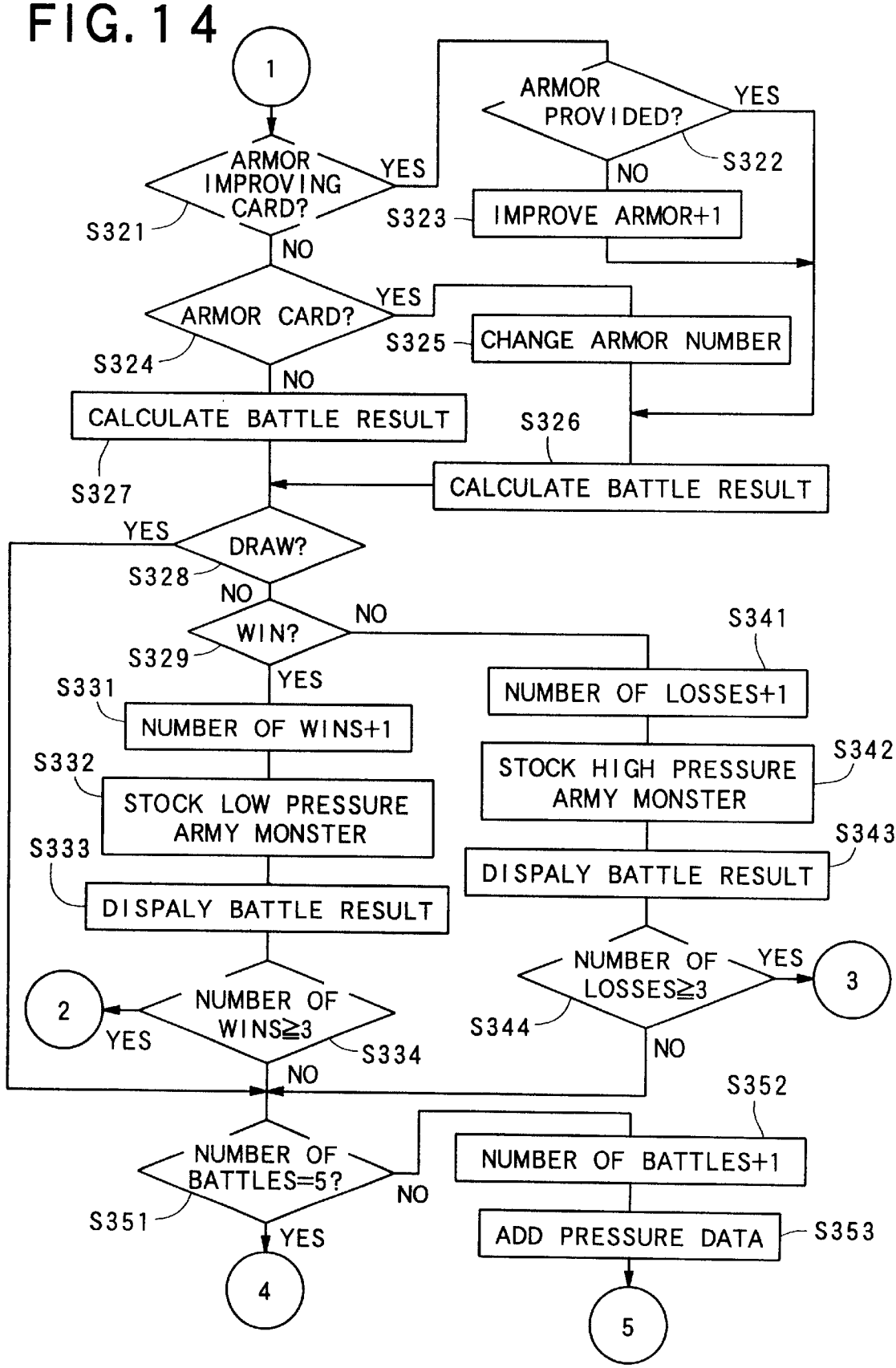
FIG. 14 is a flowchart continuing from FIG. 13.
Figure 15:
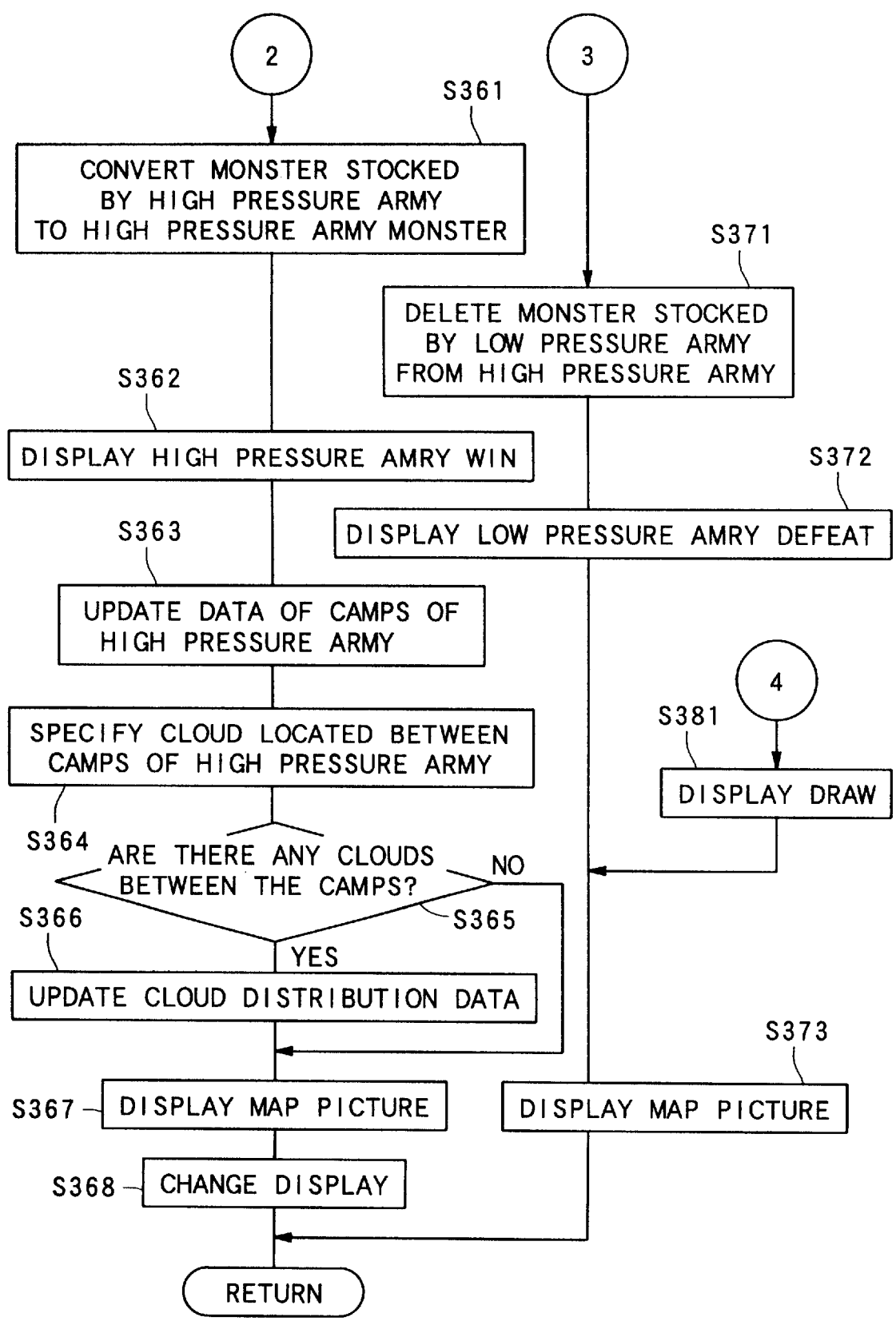
FIG. 15 is a flowchart continuing from FIG. 14.

The battle procedure in Step S107 is executed according to the procedure shown in FIG. 13 to FIG. 15. In this procedure, data showing organization of the low pressure army at the next battle position, selected in Step S105 of FIG. 10, is read out from the ROM 10a and stored in the RAM 4 (Step S301), and five atmospheric pressure data cards 230 . . . 230, to be dealt out respectively to the high pressure army and the low pressure army, are determined and stored in the RAM 4 (Step S302). Then, the number of battles stored in the RAM 4 is set to 1, and the numbers of wins and losses are each set to 0 (Step S303).

After this, data is obtained for the monster cards 210 and 220 of the high pressure army and the low pressure army which correspond with the present battle number (Step S304). For instance, if this is the first battle, the monster number with the order 1 is identified from the data stored in the RAM 4, which shows the organization of both the high pressure army and the low pressure army, and the name and HP and the like of each of the monster cards 210 and 220 which corresponds to this monster number is obtained from the data in the ROM 10a, and are written in a predetermined region of the RAM 4.

Next, the contents of the battle picture 200 are updated to correspond with the present battle number (Step S305). The battle picture 200 is displayed at this step when in the first battle. Thereafter, it is determined whether the player has selected the atmospheric pressure data card 230 to use during this battle (Step S306). For instance, the five pressure data cards 230 dealt out to the high pressure army are sequentially displayed on the monitor 6 in correspondence with a predetermined operation of the input device 2, and, when the player performs a predetermined operation using the input device 2, it is determined that the atmospheric pressure data card 230 being displayed on the monitor 6 at that point is the one selected by the player.

When it has been determined in Step S306 that no atmospheric pressure data card 230 was selected, it is determined whether the player has used the input device 2 to request a detail display of the atmospheric pressure data card (Step S307), and when such a request has been determined, an atmospheric pressure card picture 500 (FIG. 7), which shows details of the atmospheric pressure data card, is displayed on the monitor 6 (Step S308). The atmospheric pressure card picture 500 shows the atmospheric pressure data card 230 which is presently being selected from among the five atmospheric pressure data cards 230 dealt out to the high pressure army, a data section 502 presenting the name and the strength of that atmospheric pressure data card 230 . . . 230, and a comment section 503 about the atmospheric pressure data card 230. The image of the atmospheric pressure data card 230 and the display contents of the sections 502 and 503 are decided based on data stored in the ROM 10a (see FIG. 9).

After the atmospheric pressure card picture 500 has been displayed, it is determined whether the input device 2 has been used to request cancellation of the display (Step S309), and when cancellation is requested, the procedure returns to Step S306. When it has been determined in Step S307 that the detailed display of the atmospheric pressure card is not requested, it is determined whether the input device 2 has been operated to request display of the monster detail picture 400 (FIG. 5) showing information about the monster card 210 used in the present battle (Step S310). Then, when display of the monster detail picture 400 has been requested, the monster detail picture 400 is displayed (Step S311), and thereafter, it is determined whether the input device 2 has been operated to request cancellation of the display (Step S312). When the cancellation is requested, the procedure returns to Step S306. When it is determined as negative at Step S310, the CPU 1 skips Steps S311 and S312, and returns the procedure to Step S306.

When it has been determined in Step S306 that the atmospheric pressure data card was selected, the CPU 1 stores the selection result in the RAM 4 and advances the procedures to Step S321 of FIG. 14. In Step S314, it is determined whether the selected atmospheric pressure data card is the "armor improving card" (Step S321), and, when this has been affirmed, the CPU 1 refers to the high pressure army organization data stored in the RAM 4 (see FIG. 9D) to determine whether or not the monster card 210 which corresponds to the present battle number is provided with the armor (Step S322). If the armor is provided, the level of the armor is raised one step higher (Step S323). That is, armor data with an effect which is one rank higher than the present armor data is chosen from the armor data stored in the RAM 10a (see FIG. 9B), the number of the armor data which was registered in correspondence with the monster number of the present battle is changed to the number of the newly selected armor data in the high pressure army organization data in the RAM 4, and thereafter, the CPU 1 advances the procedure to Step S326. When it is determined in Step S322 that no armor is provided, the CPU 1 skips Step S323 and advances the procedure to Step S326.

When it has been determined in Step S321 that the armor improving card was not selected, it is determined whether or not an "armor card" has been selected (Step S324), and when the "armor card" has been selected, the number of the armor data which was registered in correspondence with the monster number of the present battle is changed to the number of the newly selected armor data in the high pressure army organization data in the RAM 4, and thereafter, the CPU 1 advances the procedure to Step S326.

In Step S326, the battle result is calculated by using the following calculation.

Battle result=Attack force of high pressure army+attack force of low pressure army where Attack force of high pressure army=monster card HP+armor card effect Attack force of low pressure army=monster card HP−armor card effect On the other hand, when it has been determined in Step S324 that the armor is not provided, the CPU 1 advances the procedure to Step S327 without replacing the armor number, and calculates the battle result according to the following calculation.

Battle result=Attack force of high pressure army+attack force of low pressure army where Attack force of high pressure army=monster card HP+armor card effect+atmospheric pressure data effect Attack force of low pressure army=monster card HP−armor card effect−atmospheric pressure data effect Then, after the battle result has been calculated in Step S326 or S327, the outcome is determined in Steps S328 and S329. The outcome is determined based on the comparison between the value calculated as the battle result and a predetermined value. For instance, when the battle result is greater than 2000 HP, the high pressure army wins, when it is less than 2000 HP, the low pressure army wins, and when it is exactly 2000 HP, the two armies draw. This process corresponds to the natural phenomenon whereby the atmospheric pressure is high when high pressure is dominant, and atmospheric pressure is low when low pressure is dominant.

When the high pressure army has won, the negative determination is made at Step S328 and the affirmative determination is made at Step. In this case, the CPU 1 adds 1 to the number of wins stored in the RAM 4 (Step S331), and stores in the RAM 4 the monster number of the monster card 220 of the low pressure army, which is used in this battle, as high pressure army stock (Step S332). Then, the battle result is displayed on the monitor 6 (Step S333), and it is determined whether the number of wins stored in the RAM 4 is three or more (Step S334). When the number of wins is less than three, the CPU 1 advances the procedure to Step S351, and determines whether the number of battles stored in the RAM 4 is five (Step S351). When the number of the battles has not reached five, the CPU 1 adds 1 to the number of the battles (Step S352). Then, the atmospheric pressure data card which was used in this battle is deleted from the five atmospheric pressure data cards stored in the RAM 4, one atmospheric pressure data card is randomly selected from the atmospheric pressure card data in the ROM 10a and added to the four atmospheric pressure data cards stored in the RAM 4 (Step S353). Thereafter, the CPU 1 returns the procedure to Step S304 of FIG. 13 and shifts to the next battle.

When the battle result calculated in Step S326 or S327 of FIG. 14 is a draw, the CPU1 determines to be affirmative at Step S328, and advances the procedure to Step S351. Furthermore, when the calculated battle result indicates a defeat of the high pressure army, the CPU 1 determines to be negative at both Steps S328 and S329, and advances the procedure to Step S341. In Step S341, the CPU 1 adds 1 to the number of losses stored in the RAM 4, and stores in the RAM 4 the monster number of the monster card 210 of the high pressure army, which is used in this battle, as low pressure army stock (Step S342). Then, the battle result is displayed on the monitor 6 (Step S343), and it is determined whether or not the number of losses stored in the RAM 4 is less than three (Step S344). When the number of losses is less than three, the CPU 1 advances the procedure to Step S351.

When the CPU 1 determines in Step S334 that the number of wins is three or more, the CPU 1 advances the procedure to Step S361 of FIG. 15. In Step S361, the monster number of the monster card of the low pressure army, stored in the RAM 4 as the stock of the high pressure army, is converted to a monster number of a monster card of the high pressure army, and the converted monster number is added to the organization data of the high pressure army (FIG. 9D). The relation of the monster numbers before and after conversion is set beforehand based on the high pressure army monster card data stored in the ROM 10a (see FIG. 9B). Thus, by adding a new monster number to the high pressure army organization data, the number of monster cards 210 which can be selected in subsequent battles is increased.

Following the processing of Step S361, the information indicating the win of the high pressure army is displayed on the monitor 6 (Step S362), and the high pressure army camp data stored in the RAM 4 is updated so that the present battle position on the map picture 100 is identified as the camp 101 of the high pressure army (Step S363).

Thereafter, the cloud or clouds 102, which are enclosed in the vertical, horizontal or diagonal direction by the increased high pressure army camp 101 and by the high pressure army camps 101 which have been obtained already, is extracted based on data relating to the distribution of the camps 101 and the clouds 102 stored in the RAM 4 (Step S364), and then, it is determined whether the enclosed cloud 102 has been extracted (Step S365). When the cloud 102 has been extracted, it is deleted from the map picture 100, and data in the RAM 4 relating to distribution of the clouds 102 is updated (Step S366).

Thereafter, the pre-battle map picture 100 is displayed on the monitor 6 (Step S367), and then, the map picture 100 is changed based on the updated data relating to the distribution of the camps 101 and the clouds 102 stored in the RAM 4 (Step S368). As a result of this change, the map picture 100 reflects the increase of the camps 101 and decrease of the clouds 102. After the processing of Step S368, the battle procedure ends and the CPU 1 advances the procedure to Step S108 of FIG. 11. Here, when it is determined to be negative in Step S368, the CPU 1 skips Step S366 and advances the procedure to Step S367.

On the other hand, when the number of losses is determined to be three or more in Step S344, the CPU 1 advances the procedure to Step S371 of FIG. 15. In Step S371, the monster number corresponding to the high pressure army monster card, stored in the RAM 4 as the stock of the low pressure army, is deleted from the high pressure army organization data stored in the RAM 4 (Step S371). As a consequence, there are fewer monster cards 210 which can be selected in the next battle. After the processing of Step S371, the information indicating the defeat of the high pressure army is displayed on the monitor 6 (Step S372). Next, the pre-battle map picture 100 is displayed on the monitor 6 (Step S373), and thereafter, the battle procedure ends and the CPU 1 advances the procedure to Step S108 of FIG. 11.

Furthermore, when it is determined in Step S351 of FIG. 14 that the battle number is five, the CPU 1 advances the procedure to Step S381 of FIG. 15 and displays information indicating a draw on the monitor 6. After this, the CPU 1 advances the procedure to Step S373.

In the embodiments described above, the monster cards 210 and 220 correspond to characters respectively belonging to the player and his or her opponent; the pressure data cards 230 correspond to auxiliary characters; the battle picture 200 of FIG. 6 corresponds to a first picture; the map picture 100 of FIG. 2 corresponds to a second picture; the entire map picture 100 corresponds to a field; the extent in the map picture 100 where the clouds 102 are displayed corresponds to the territory belonging to the opponent; and extent without the clouds 102 corresponds to the territory belonging to the player. Furthermore, the ROM 10a comprises both first and third storing devices; the RAM 4 comprises a second storing device; and other devices are realized by using a combination of the CPU 1 and particular software. More specifically, Step S305 of FIG. 13, and Steps S333 and S343 of FIG. 14 cause the CPU 1 to be a first display control device; Steps S326, S327, S328, S329, S334, S344 and S351 cause the CPU 1 to be an outcome determining device; Step S101 of FIG. 11, and Steps S367 and S368 of FIG. 15 cause the CPU 1 to be a second display control device; Steps S363, S364, S365 and S366 of FIG. 15 cause the CPU 1 to be a data updating device; Steps S204, S205, S221 and S222 of FIG. 14 cause the CPU 1 to be an order indicating device; Steps S326, S327, S328 and S329 of FIG. 14 cause the CPU 1 to be an individual outcome determining device; Steps S334, S344 and S351 of FIG. 14 cause the CPU 1 to be a general outcome determining device; Steps S205 and S222 of FIG. 12 cause the CPU 1 to be a use order changing device; Step S302 of FIG. 13 causes the CPU 1 to be an auxiliary character allocating device; Step S306 of FIG. 13 causes the CPU 1 to be a combination selecting device; and Step S105 of FIG. 11 causes the CPU 1 to be a next potential area selecting device. The present invention is not restricted to the above example wherein various devices are realized by the combination of the CPU and particular software, and part or all thereof may be realized using a logical circuit such as an LSI.

As described above, according to the present invention, the outcome of a competitive game, executed on a first picture, can be determined with comparatively simple rules, and therefore it is possible to provide a game system which eliminates the difficulty of understanding the game, while preventing the rules from becoming complex, and thereby enabling many players to grow accustomed to the game and to play casually. On the other hand, since the increase of areas on a second picture can be diversified, eliminating monotony of the game, it is possible to engage the interests of many players over a long time period.

What is claimed is:

1. A game system, comprising:
    a first storing device storing data for identifying strength and weakness of characters belonging to a player and an opponent;
    a first display control device for displaying a first game picture which expresses a state of a competitive game in which the player and the opponent compete by using the characters;
    an outcome determining device for determining an outcome of the competitive game based on the data stored in the first storing device;
    a second storing device storing data for identifying, with respect to a plurality of areas defined by dividing a predetermined field into a matrix, that each of the areas belongs to a territory of the player or the opponent;
    a second display control device for displaying a second game picture, on which the field is expressed in such a manner that the territory belonging to the player can be differentiated from the territory belonging to the opponent, based on the data stored in the second storing device; and a data updating device for changing the data in the second storing device so that, when the player won the competitive game, there is a first change relating to the win, in that the territory belonging to the player increases, and in addition, there is a second change relating to the increase of the territory, in that at least one of the areas which is in a predetermined positional relationship with an increased part of the territory by the first change and an acquired part of the territory already belonging to the player is switched to the territory belonging to the player.

2. The game system according to claim 1, further comprising:

an auxiliary character allocating device for allocating at least one auxiliary character to at least one of the player and the opponent when the competitive game is played, said auxiliary character being able to be used in combination with at least one of the characters; and a third storing device storing data for identifying effects of the auxiliary character on the competitive game, wherein the outcome determining device determines the outcome of the competitive game by considering the data stored in the third storing device.

3. The game system according to claim 2, wherein the auxiliary character allocating device allocates a plurality of auxiliary characters as said at least one auxiliary character to the player; and a combination selecting device selects a combination of the characters and the auxiliary characters, based on an instruction from the player.

4. The game system according to claim 1, wherein the data updating device extracts said at least one of the areas which is enclosed within the field vertically, horizontally or diagonally by the increased part and the acquired part of the territory, and changes the data in the second storing device so that said extracted at least one of the areas is switched to the territory belonging to the player.

5. The game system according to claim 4, further comprising a next potential area selecting device for selecting one of the areas as a potential next area which can potentially be changed to the territory belonging to the player in compliance with an instruction of the player, in advance of an execution of the competitive game, wherein, when the player has won the competitive game after the potential next area has been selected, in a first change relating to this win, the data updating device changes the data in the second storing device so that the potential next area selected by the next potential area selecting device becomes the territory belonging to the player.

6. The game system according to claim 5, wherein selection of the next area by the next potential area selecting device and the competitive game can be repeated until all of the areas within the field are switched to the territory belonging to the player.

7. The game system according to claim 5, wherein the potential next area which can be selected by the next potential area selecting device in advance of one turn of the competitive game is restricted to a part of the areas within the field.

8. A game system, comprising:

a first storing device storing data for identifying strength and weakness of a plurality of characters belonging to each of a player and an opponent;

a first display control device for displaying a first game picture which expresses a state of a competitive game in which the player and the opponent compete by using the characters in a predetermined order;

an order indicating device for indicating the order in which the player uses the characters in the competitive game;

an outcome determining device for determining an outcome of the competitive game based on the data stored in the first storing device;

a second storing device storing data for identifying, with respect to a plurality of areas defined by dividing a predetermined field into a matrix, that each of the areas belongs to a territory of the player or the opponent;

a second display control device for displaying a second game picture, on which the field is expressed in such a manner that the territory belonging to the player can be differentiated from the territory belonging to the opponent, based on the data stored in the second storing device; and a data updating device for changing the data in the second storing device so that, when the player won the competitive game, there is a first change relating to the win, in that the territory belonging to the player increases, and in addition, there is a second change relating to the increase of the territory, in that at least one of the areas which is in a predetermined positional relationship with an increased part of the territory by the first change and an acquired part of the territory already belonging to the player is switched to the territory belonging to the player.

9. The game system according to claim 8, wherein the outcome determining device comprises:

an individual outcome determining device for determining an individual outcome of a match between the characters each time the player and the opponent use the characters in accordance with a predetermined order, based on the data stored in the first storing device; and a general outcome determining device for determining the outcome of the competitive game between the player and the opponent based on a result of a plurality of determinations of the individual performance determining device.

10. The game system according to claim 8, further comprising a use order changing device for changing use order of the characters of the player based on an instruction from the player.

11. The game system according to claim 8, further comprising:

an auxiliary character allocating device for allocating at least one auxiliary character to at least one of the player and the opponent when the competitive game is played, said auxiliary character being able to be used in combination with at least one of the characters; and a third storing device storing data for identifying effects of the auxiliary character on the competitive game, wherein the outcome determining device determines the outcome of the competitive game by considering the data stored in the third storing device.

12. The game system according to claim 11, wherein the auxiliary character allocating device allocates a plurality of auxiliary characters as said at least one auxiliary character to the player; and a combination selecting device selects a combination of the characters and the auxiliary characters, based on an instruction from the player.

13. The game system according to claim 8, wherein the data updating device extracts said at least one of the areas which is enclosed within the field vertically, horizontally or diagonally by the increased part and the acquired part of the territory, and changes the data in the second storing device so that said extracted at least one of the areas is switched to the territory belonging to the player.

14. The game system according to claim 13, further comprising a next potential area selecting device for selecting one of the areas as a potential next area which can potentially be changed to the territory belonging to the player in compliance with an instruction of the player, in advance of an execution of the competitive game, wherein, when the player has won the competitive game after the potential next area has been selected, in a first change relating to this win, the data updating device changes the data in the second storing device so that the potential next area selected by the next potential area selecting device becomes the territory belonging to the player.

15. The game system according to claim 14, wherein selection of the next area by the next potential area selecting device and the competitive game can be repeated until all of the areas within the field are switched to the territory belonging to the player.

16. The game system according to claim 14, wherein the potential next area which can be selected by the next potential area selecting device in advance of one turn of the competitive game is restricted to a part of the areas within the field.

17. A computer-readable recording medium, in which a program for executing a predetermined game with referring to first data and second date is recorded, said first date being prepared for identifying strength and weakness of characters belonging to a player and an opponent, said second data being prepared for identifying, with respect to a plurality of areas defined by dividing a predetermined field into a matrix, that each of the areas belongs to a territory of the player or the opponent, said program being read out by a computer and causing the computer to execute the steps of;

displaying a first game picture which expresses a state of a competitive game in which the player and the opponent compete by using the characters;

determining an outcome of the competitive game based on the first data;

displaying a second game picture, on which the field is expressed in such a manner that a territory belonging to the player can be differentiated from the territory belonging to the opponent, based on the second data; and changing the second data so that, when the player won the competitive game, there is a first change relating to the win, in that the territory belonging to the player increases, and in addition, there is a second change relating to the increase of the territory, in that at least one of the areas which is in a predetermined positional relationship with an increased part of the territory by the first change and an acquired part of the territory already belonging to the player is switched to the territory belonging to the player.

18. A computer-readable recording medium, in which a program for executing a predetermined game with referring to first data and second date is recorded, said first date being prepared for identifying strength and weakness of a plurality of characters belonging to each of a player and an opponent, said second data being prepared for identifying, with respect to a plurality of areas defined by dividing a predetermined field into a matrix, that each area belongs to the player or to the opponent, said program being read out by a computer and causing the computer to execute the steps of;

displaying a first game picture which expresses a state of a competitive game in which the player and the opponent compete by using the characters in a predetermined order;

determining an outcome of the competitive game based on the first data;

displaying a second game picture, on which the field is expressed in such a manner that the territory belonging to the player can be differentiated from the territory belonging to the opponent, based on the second data; and changing the second data so that, when the player won the competitive game, there is a first change relating to the win, in that the territory belonging to the player increases, and in addition, there is a second change relating to the increase of the territory, in that at least one of the areas which is in a predetermined positional relationship with an increased part of the territory by the first change and an acquired part of the territory already belonging to the player is switched to the territory belonging to the player.

* * * * *